United States Patent  (10) Patent No.: US 8,838,834 B2
Reynolds  (45) Date of Patent: Sep. 16, 2014

(54) THREAT IDENTIFICATION AND MITIGATION IN COMPUTER MEDIATED COMMUNICATION, INCLUDING ONLINE SOCIAL NETWORK ENVIRONMENTS

(76) Inventor: Ted W. Reynolds, Winter Springs, FL (US)

( * ) Notice: Subject to any disclaimer, the term of this patent is extended or adjusted under 35 U.S.C. 154(b) by 302 days.

(21) Appl. No.: 13/352,303

(22) Filed: Jan. 17, 2012

(65) Prior Publication Data

US 2012/0185611 A1 Jul. 19, 2012

Related U.S. Application Data

(60) Provisional application No. 61/433,221, filed on Jan. 15, 2011.

(51) Int. Cl.
*G06F 15/16* (2006.01)
*G06F 15/173* (2006.01)
*G06Q 10/10* (2012.01)
*G06Q 50/00* (2012.01)
*G06Q 50/26* (2012.01)

(52) U.S. Cl.
CPC .............. *G06Q 10/10* (2013.01); *G06Q 50/01* (2013.01); *G06Q 50/265* (2013.01); *G06Q 10/107* (2013.01)
USPC .......................................... 709/246; 709/224

(58) Field of Classification Search
USPC .................................. 709/203, 223–224, 246
See application file for complete search history.

(56) References Cited

U.S. PATENT DOCUMENTS

| | | | |
|---|---|---|---|
| 7,225,122 B2 * | 5/2007 | Shaw | 704/9 |
| 7,461,339 B2 * | 12/2008 | Liao et al. | 715/239 |
| 7,610,382 B1 * | 10/2009 | Siegel | 709/226 |
| 8,559,425 B2 * | 10/2013 | Gardell | 370/389 |
| 2004/0131160 A1 * | 7/2004 | Mardirossian | 379/38 |
| 2004/0210773 A1 * | 10/2004 | Markosi, III | 713/201 |
| 2005/0086255 A1 * | 4/2005 | Schran et al. | 707/102 |
| 2006/0064740 A1 * | 3/2006 | Kelley et al. | 726/3 |
| 2006/0123106 A1 * | 6/2006 | Blair et al. | 709/224 |
| 2008/0049027 A1 * | 2/2008 | Hauke | 345/502 |
| 2008/0134282 A1 * | 6/2008 | Fridman et al. | 726/1 |
| 2008/0276317 A1 * | 11/2008 | Chandola et al. | 726/23 |
| 2009/0299925 A1 * | 12/2009 | Ramaswamy et al. | 706/12 |
| 2010/0119053 A1 * | 5/2010 | Goeldi | 379/265.09 |
| 2010/0174813 A1 * | 7/2010 | Hildreth et al. | 709/224 |
| 2010/0280828 A1 * | 11/2010 | Fein et al. | 704/246 |
| 2011/0035681 A1 * | 2/2011 | Mandel et al. | 715/752 |
| 2011/0078754 A1 * | 3/2011 | Howcroft et al. | 725/110 |
| 2011/0142237 A1 * | 6/2011 | Iasso | 380/259 |
| 2012/0036147 A1 * | 2/2012 | Borst et al. | 707/769 |
| 2013/0304456 A1 * | 11/2013 | Spears | 704/9 |

* cited by examiner

*Primary Examiner* — Joshua Joo
(74) *Attorney, Agent, or Firm* — John DeAngelis; Beusse Wolter Sanks & Maire, P.A.

(57) ABSTRACT

A method for combating electronic communication that may cause an individual to adopt extremist or terrorist philosophies. The method comprises intercepting electronic communication intended for or initiated by the individual over an Internet communication medium, identifying electronic communication, as intercepted, that relate to extremist or terrorist philosophies, analyzing content of the electronic communication that relates to extremist or terrorist philosophies, injecting counter-narrative content to the individual's communication stream to counter determined content, and displaying text associated with one or more of the method steps on a display screen.

1 Claim, 3 Drawing Sheets

THREAT IDENTIFICATION AND MITIGATION IN COMPUTER MEDIATED COMMUNICATION, INCLUDING ONLINE SOCIAL NETWORK ENVIRONMENTS

CLAIM OF PRIORITY

This application claims priority under 35 U.S.C. section 119(e) to the U.S. Provisional Patent Application assigned application No. 61/433,221 entitled Understanding and Combating Radicalization and Recruitment into Extremist/Terrorist Groups in Online Social Network Environments and filed on Jan. 15, 2011, the entire contents of which are hereby incorporated by reference.

FIELD OF THE INVENTION

The various embodiments of this invention relate to apparatuses and methods for identifying terrorist threats and mitigating those threats through the use of computer-mediated communication, including communication through online social networks.

BACKGROUND OF THE INVENTION

The present invention centers on monitoring computer-mediated communication (CMC) toward identifying potential threats and implanting mitigating content to counter the ongoing narrative of the group/individual. The primary target of this invention is the monitoring of extremist/terrorist CMC toward the identification of patterns of radicalization and recruitment, the identification of threats based upon the findings of multi-variable threat matrix, and the implementation of counter-narrative messaging to dissuade users from becoming radicalized.

As western counter-terrorism efforts have limited the various person-to-person avenues for the spread of extremist ideology by outlawing 'hate-speech' in public forums, mosques, and in print, as well as identifying and arresting known terrorist recruiters, these communications have been driven underground and the investment by extremist groups in on-line forums and websites, and the level of participation within these websites, has grown substantially. Increasingly, those arrested on suspicion of terrorism or those actually engaging in terrorist acts indicate they began their 'journey' by visiting extremist websites, participating in chat rooms, and watching extremist and/or jihadi videos.

Current research suggests that behavior modification is possible via human-computer interaction. Further, the ability to socially interact on the computer has evolved to the level of real-time communications. This allows for iterative computer mediated dialogue to be considered an equal to face-to-face communication. This change in perception is critical to understanding the interactive effect of extremist websites, online social networks, and other CMC on individuals considered vulnerable to extremist radicalization.

The potential danger of online radicalization is highlighted in the United Kingdom's Strategy for Countering International Terrorism (March 2009). Noted within this document is the threat posed by "self-starting networks, or even lone individuals, motivated by an ideology similar to that of Al-Qaeda, but with no connection to that organization; and terrorist groups that follow a broadly similar ideology as Al-Qaeda but that have their own identity and regional agenda." Further, the document acknowledges the role and impact of the internet in the "two way dialogue between their organizations and their actual or prospective members . . . that enables fundraising, recruitment, and some training and operational planning." Previous action by far-right/anti-immigration groups and recent calls by extremist Islamists to move out of their password protected chat-rooms and expand onto social network sites like Facebook and Twitter in order to 'appeal to the masses', just as they have used YouTube to spread extremist propaganda, is a disturbing development given the trend of online radicalization seen in recent arrests.

DETAILED DESCRIPTION OF INVENTION

Figure 1:
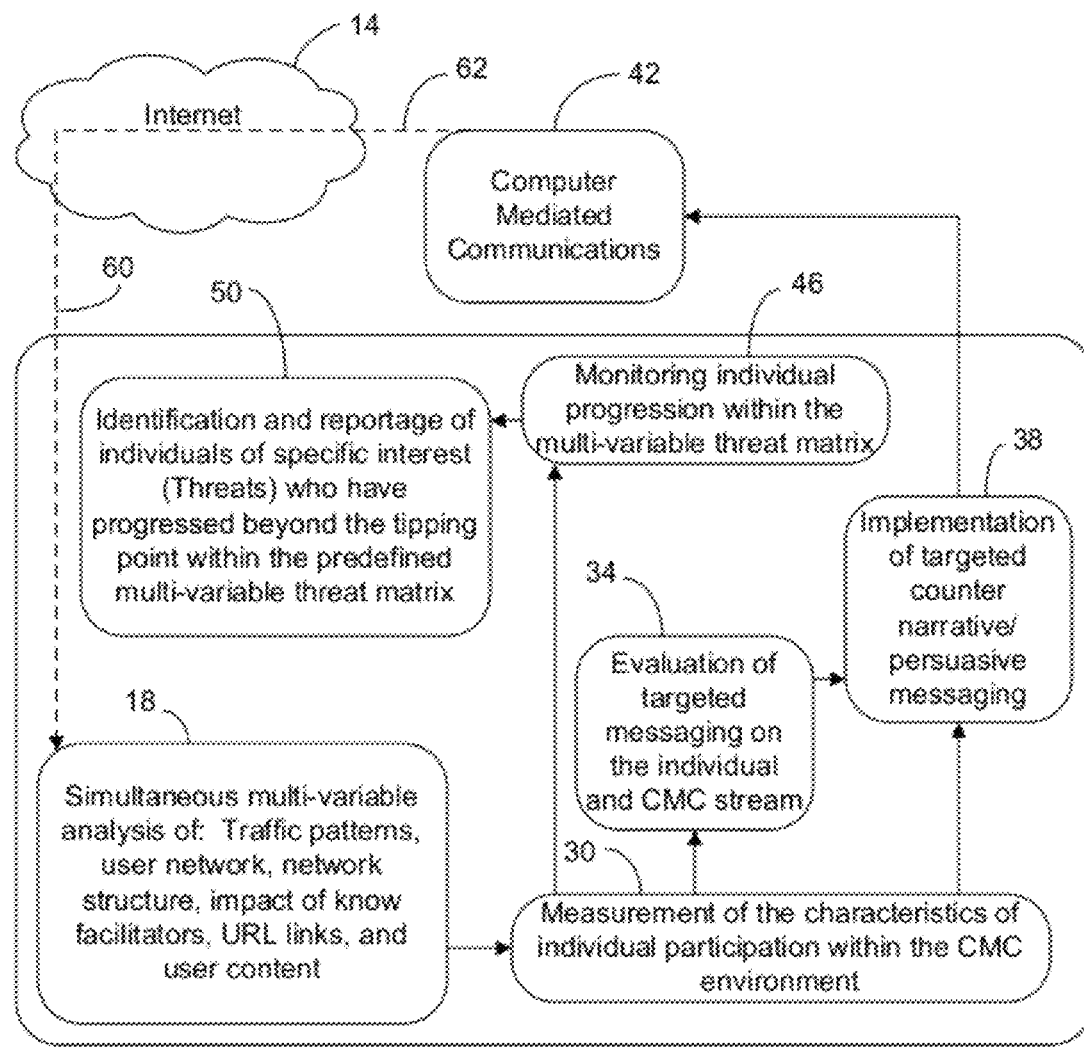
FIG. 1 is a functional block diagram of an apparatus for determining monitoring electronic communication and injecting counter-narrative content as appropriate.

Before describing in detail the particular apparatuses and methods for identifying threats and mitigating those threats through the use of computer-mediated communication, in accordance with the various embodiments of the present invention, it should be observed that these embodiments reside primarily in a novel combination of hardware and software elements related to the claimed apparatuses and methods. Accordingly, the hardware and software elements have been represented by conventional elements in the drawings, showing only those specific details that are pertinent to the presented embodiments, so as not to obscure the disclosure with details that will be readily apparent to those skilled in the art having the benefit of the description herein.

The following embodiments are not intended to define limits as to the structures or methods of the invention but only to provide exemplary constructions. The embodiments are permissive rather than mandatory and illustrative rather than exhaustive.

Generally, the embodiments of the present invention analyze multiple variables to determine how computer-mediated communication can facilitate radicalization and formal recruitment into an extremist organization, where such organizations are known to or suspected of carrying out terrorist actions against countries, cultures or religious organizations having views (e.g., religious or cultural) that are anathema to the organization. These variables may include, but are not be limited to:

(1) An individual's patterns of participation in such an organization, including exposure to the narratives of the organization and the period of social learning about the organization. When an individual first begins to visit/interact with a new online environment there is a period of social learning (also known as lurking) during which the individual simply observes the group activity to learn the nomenclature and the agenda of the group. Social learning is necessary so the individual participant does not 'say' something that might get him/her sanctioned/removed from the group. This period of social learning is likely the most effective time for interdiction as there has been insufficient time for assimilation with the group narrative.

(2) Development of the individual's social network as related to extremist/terrorist activities, including identifying facilitators and recruiters within those networks. Facilitators/recruiters are identified using social network analysis that indicates those individuals that act as communication hubs within the group. It is known through the inventor's ongoing analysis that within the membership of the groups there is a core of participants who account for the majority of the online activity to disseminate the group narrative and interact with the general membership. Of the groups studied, these facilitators, who account for the majority of the traffic, represent about 1-2% of the entire membership.

(3) Examining changes in the individual's dialog over time as those changes reflect identification with and acceptance of an extremist narrative. This examination includes an analysis of the use of key words/phrases that indicate an acceptance of the group's narrative, comments concerning or sharing of URL (uniform resource locator) links that espouse the group's narrative and engagement (e.g., electronic communications) with other members regarding ideological issues.

(4) Linking the extremist dialog with socio-political events/triggers or with exposure to certain extremist content, links or facilitators. Certain events that impact the group (legislation, attacks, arrests, etc.) will provoke a reaction from individuals within the group or that have a connection with that group. Further, how the individual responds to contact with URL links, other extremist content, and facilitators provides a measure of the individual's acceptance of and identification with the extremist narrative. Ongoing research by the inventor indicates that only a subset of 6-7% of the overall membership actually engage in an ongoing dialog within other group members, and a small subset within this subset engage on a regular basis with other group members. This small subset is the target of such analysis.

(5) Determining the impact of the content associated with embedded URL links on the group and individual narrative and the nature of the content, e.g., motivational or operational. Responses to the URL links, which most often are presented in such a way as to build group solidarity by either reinforcing the group narrative or furthering the us-vs-them paradigm of the membership. The simple fact that an individual responds to these links is significant and the content of that response, which indicates an acceptance or rejection of the narrative, provides a useful measure.

(6) Identifying patterns of radicalization and recruitment within the network.

(7) Identifying points along the radicalization continuum where targeted counter messaging is most effective. These messages include counter-narrative and/or persuasive messages to discourage or dissuade the individual from continued group participation in the group. The system of the invention identifies key points within the individual's participation pattern where these interdictions should be most effective. System triggers for this automated implantation include but are not limited to, use of certain key words/phrases; interaction with certain individuals/facilitators that are known to be the most influential within the group; and posting of traffic that would indicate a questioning of the group narrative (interdictions in this case would serve to reinforce those doubts and move the individual away from the group).

(8) Identifying a "tipping point", via a multi-variable threat matrix, at which point intervention with counter messages is no longer effective. Ongoing research indicates that the multi-variable threat matrix would include the cumulative/integrated results of the traffic analysis (how often the individual participates within the group); continued contact with extremist URL links and known facilitators/recruiters; and the increased use of key words/phrases that indicate an acceptance of and identification with the group narrative that would include the use of words/phrases that reveal an indication of pending violent action through the change of agency in the words/phrases being used. An example of a change of agency can be seen when someone shifts from making statement like, "I wish those people would just go away", to stating, "I want to kill those people."

The present invention analyzes the impact of the electronic communication stream and the development of the extremist narrative and its component parts, as reflected in the discourse within the computer-mediated communication, by using collection and analytical tools that facilitate a multi-level cascading statistical analysis of the collected information.

Further, the invention includes an integrated messaging component that allows implantation of counter-narrative messages/interdictions within the CMC stream and the ability to measure the impact of those messages on the users. This function is currently designed to automatically implant these messages when the individual uses certain key/words and phrases. Further, contact with certain content or individuals that includes but is not limited to extremist URL links, and facilitators/recruiters can also trigger prepared counter-messages that are context-specific and stored within the system. As an example, if an individual who is participating within a jihadi site comes in contact with a video of an Anwar al-Awlaki sermon, a previously-prepared counter message by a well known Islamic scholar would be sent to counter the influence of the Awlaki video and create doubt within the individual and the group.

The hardware/software components of the invention automatically monitor computer mediated communications to identify, analyze and attempt to determine the effect of these communications on the individual, identify those individuals who are most susceptible to this persuasion, and implant automated interdictions that allow for the deceleration of the individual identification with the narrative of the group they are engaged with. The nature, content and frequency of the counter-narrative interdictions can be tailored based on the degree to which the individual has adopted the group's extremist or terrorist narrative and/or the individual's susceptibility to persuasion by other members of the group.

In the realm of extremist groups, the system monitors the computer-mediated communication of these groups and individuals, identifies those individuals who are on the path to accepting the extremist narrative (by evaluating the level and extent of their participation within the group, their use of key words/phrases that indicate an identification with and acceptance of the extremist narrative, and their increased participation/interaction with known facilitators/recruiters). The system provides automated interdictions (i.e., mitigating content or counter-narrative messages) that seek to dissuade these individuals from continuing along this path. The system includes metrics, based upon the individuals interaction with and response to the implantation, including the analysis of the response content and whether the individual shares this content with others or uses it in future CMS's, to determine whether these interdictions are effective and if the individual's identification with the extremist narrative continues unabated and reaches a point of no return within the predetermined multi-variant threat matrix. At this point the system identifies the individual as a potential threat and places him/her on a list for more individual investigation.

This system allows for the monitoring and interdiction of hundreds of groups at any given time, in real time, and therefore provides a significant reduction in current man-hours required to monitor these same groups.

Data Collection/Processing

Data collection and analysis is performed on a live data stream in real time. Current collection and analysis rates are estimated at 40 gigabytes/second. The invention is designed to allow for the application of the functions previously mentioned for various usages. This is made possible by the establishment of the "plug and play" capabilities of the device. The end user of the data collection device determines the groups to be monitored and the key determinants of participation, interaction, and key words and phrases that the system will use to conduct the analysis. The implementation of a graphical user interface allows the user to input the initial analysis parameters. This functionality also allows for the continued modification or addition of critical search information as group dynamics change. Based upon the user input, the device provides group-specific monitoring, analysis, and threat identification.

It is important to note that the term 'computer mediated communication' (CMC) is not limited to communications only from/by/to computers. The ability to engage in CMC from mobile devices, which includes but is not be limited to, cell phones, PDA's, iPad's, etc., and the ability of the system to monitor these communications, extends the capability of the system to detect threats within CMC originating from/ involving multiple communications platforms.

Data Analysis

To understand the potential influencing factors within these communications, particularly within and extremist/terrorist environment, several separate analyses are performed simultaneously on the data stream. These include a network analysis, e.g., an analysis of an individual's network of friends/associates and his/her communications between and among those friends, and an identity of those in the communications network. This process also allows for the identification of facilitators within the social network, content or discourse analysis, and an analysis of the URL links found within the comments/posts.

Key to understanding the long term effect of exposure to the extremist narrative within these groups, the network and content analyses can be linked to determine how discourse may change over time to indicate assimilation and identification with the radical ideology/narrative. Additionally, the content analysis is used to understand the influence of URL links within the posts, email, instant messages or text messages. Lastly, the individual URL links are analyzed to consider their virility and effectiveness as persuasive agents. The URL's are a key to understanding the persuasive nature of the information (for example video's) within the group. If a particular video/link is associated with an uptick in aggressive/ flaming dialogue (which is an indicator of increased acceptance of the extremist narrative) it is then possible to develop counter-narrative links and messages to offset the influencing nature of that particular video/link.

FIG. 1 depicts the functioning of a monitoring and interdiction system 10 of the present invention. Generally, FIG. 1 is a visual representation of operation of the monitoring, interdiction, threat identification product of the present invention. Computer mediated communications are subjected to a multi-variable analysis. The characteristics of the individual's participation is measured to determine the need for the implantation of targeted messaging and the level of messaging required. The continued responses from the user dictate the level of targeted interdiction by the system as the feedback loop that allows the system to measure the effectiveness of previous interdictions.

A measuring function also allows the system to determine when a user's online dialogue/usage has reached a point of serious concern based upon a predetermined multi-variable threat matrix. Once this "tipping point" is reached the individual is identified as a possible threat for more detailed consideration.

The system 10 accesses electronic communication occurring over the Internet 14. A functional block 18 conducts a multi-variable analysis of the electronic communication, including analysis of traffic patterns, user networks, social network structure elements, impact of known facilitators, identified URL links, URL links that have been accessed and extremist/terrorist content within the electronic communication. A functional block 30 receives the results from the block 18 and measures characteristics of an individual's participation within the CMC environment based on one or more factors described above, e.g., content of initiated emails and instant messages, web sites visited, association (frequency of communication and nature of that communication) with other group members who have adopted the extremist narrative.

Once the system has determined the degree to which the target narrative has been adopted within the functional block 30, a block 34 evaluates available counter-narratives and persuasive content for rebutting the target extremist narrative with respect to the individual and the CMC stream. At a block 38 the counter-narrative and persuasive messages are prepared for inputting into the individual's data stream (e.g., through emails, text messages, instant messages, invitations to web sites presenting the counter-narrative). A computer mediated communication element 42 inputs the counter-narrative content to the individual's data stream on the Internet 14, such as by sending emails, text messages, instant messages or URL links.

A functional block 46 monitors an individual's progression along the radicalization continuum and identifies any such individuals who have progressed "beyond the tipping point" within a predefined multi-variable threat matrix to a functional block 50.

Data flow paths 60 and 62 depict publicly-available data flows.

While this system/device was originally designed for the monitoring, analysis, and threat identification within extremist/terrorist computer mediated communication, it also has conventional commercial applications. These include, but are not limited to: The monitoring of communications within a network for corporate threats. These may include, but are not be limited to:

a. E-mails or downloads from within or without that may contain viruses/bots that may be considered threats to the network.
   b. Communications from within or without the network that indicates activity related to corporate espionage.
   c. Access within the network to highly sensitive information by individuals/systems from within or without the network who are not authorized to access such information.

Note: The system identification of certain key words/phrases within CMC's as well as contact with certain known threats would trigger an alert. Further, unauthorized access to files would be facilitated by the linkage of a 'cleared list' and/or a 'no copies order' to the monitoring/search function of the system to identify anyone engaging in unauthorized access/ copying of sensitive material.

The monitoring of electronic communication to identify threats to corporate brands. Brand protection is essential in the corporate world and the identification of threats to these brands within CMC/cyberspace can prove invaluable, given the ability of the system to provide real time identification of these threat to allow for mitigation before the information reaches critical mass (i.e., goes "viral").

Law enforcement officials can monitor criminal networks or simply monitor CMC to look for criminal activity/planning within the CMC communication stream. These analytics can be used as an investigative tool. Additionally, the findings can potentially be used as evidence or as a manner of truth detection when questioning suspects.

The military can use the system 'in theater' to measure the potential for threats in a given area by monitoring the CMC within that area.

This hardware/software can allow political campaigns to monitor online communications within public forums toward identifying threats to their candidate/cause, very similar to the corporate brand protection paradigm described above.

This system provides an in-depth analysis of computer mediated communication toward the identification of threats within a predetermined multi-variable threat matrix. It also includes the ability to implant targeted content to counter the ongoing narrative, and measure the impact of that content on the users and the ongoing stream of CMC.

Systems/software for collecting and analyzing the data has considerable potential as a valuable tool in social science research. Further, the analysis fills a huge gap in terrorism studies literature regarding understanding the influence/role of extremist social networking sites in the radicalizing process.

These processes are also useful in understanding the use of these techniques in product marketing as well as in the area of political persuasion in legitimate political campaigns. Social networking and computer-mediated communication are becoming an integral part of western life with research and system just now beginning to understand the true impact and persuasive nature of these interactions on the individual.

It is clear that extremist/terrorist groups are utilizing computer mediated communication including social networking sites like Facebook and Twitter (to name just a few) to radicalize vulnerable individuals and build a pool of recruits. The ability to counter these efforts should be considered an integral part of combating terrorism, and more specifically combating the efforts to create "homegrown terrorists."

Broadly speaking, the invention teaches a method, apparatus, and program for determining extremist or terrorist philosophies in electronic communication and combating those philosophies by interdictive counter-narratives. To facilitate an understanding of the present invention, it is described with reference to specific implementations thereof.

The embodiments of the present invention may be implemented in the general context of computer-executable instructions, such as program modules executed by a computer. Generally, program modules include routines, programs, objects, components, data structures, etc. that perform particular tasks or implement particular abstract data types. For example, the software programs that underlie the invention can be coded in different languages for use with different platforms. The principles that underlie the invention can be implemented with other types of computer software technologies as well.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program features for executing the method of the invention.

Also, an article of manufacture, such as a pre-recorded disk or other similar computer program product, for use with a data processing system, could include a storage medium and a program stored thereon for directing the data processing system to facilitate the practice of the method of the invention. Such apparatus and articles of manufacture also fall within the spirit and scope of the invention.

The present invention can be embodied in the form of computer-implemented processes and apparatuses for practicing those processes. The present invention can also be embodied in the form of computer program code containing computer-readable instructions embodied in tangible media, such as floppy diskettes, CD-ROMs, hard disks, flash drives or any other computer-readable storage medium, wherein, when the computer program code is loaded into and executed by a computer or processor, the computer or processor becomes an apparatus for practicing the invention. The present invention can also be embodied in the form of computer program code, for example, whether stored in a storage medium or loaded into and/or executed by a computer, wherein, when the computer program code is loaded into and executed by a computer or processor, the computer or processor becomes an apparatus for practicing the invention. When implemented on a general-purpose computer, the computer program code segments configure the computer to create specific logic circuits or processing modules.

Figure 2:
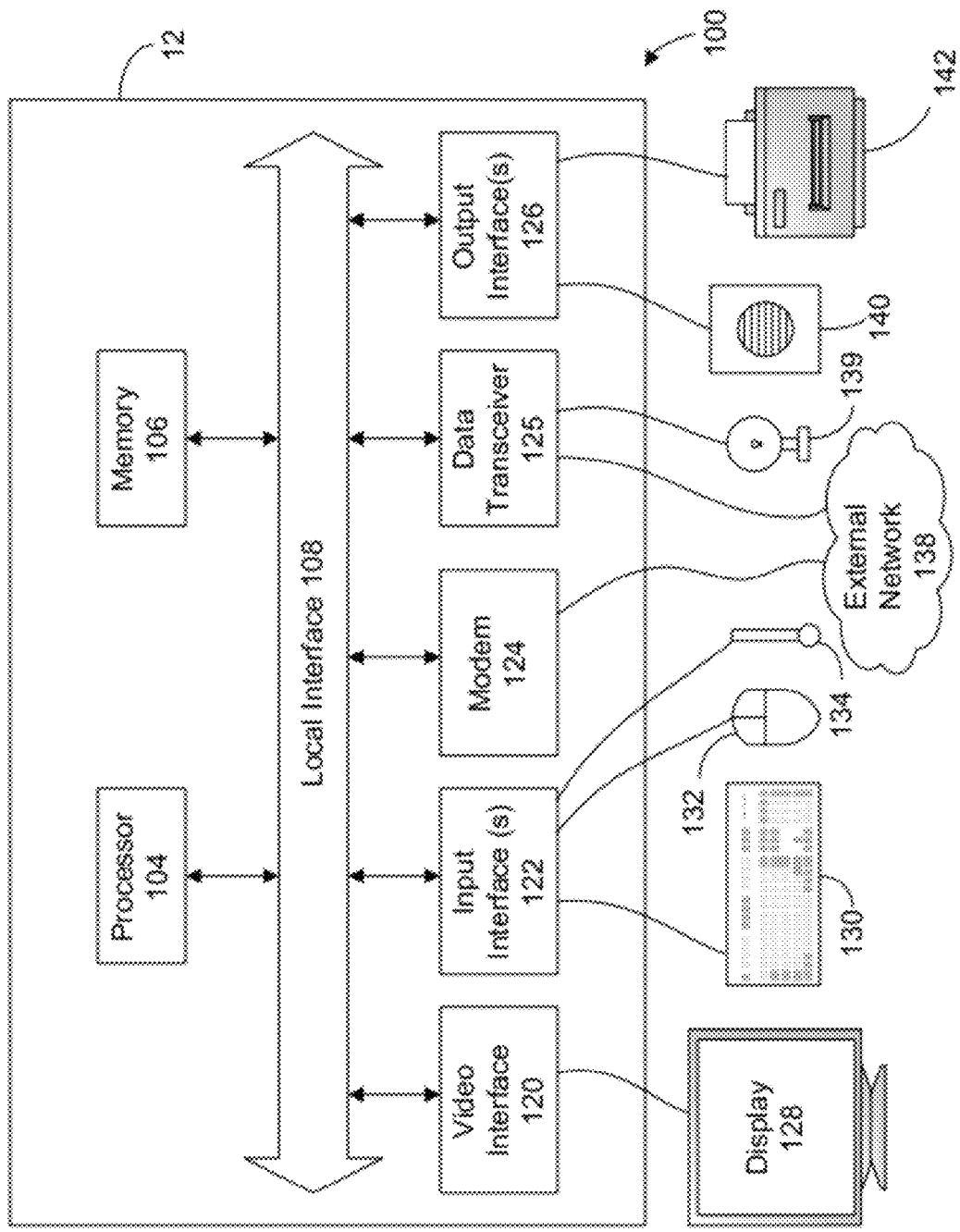
FIG. 2 is a block diagram of a computer system for use in practicing the invention.

FIG. 2 illustrates a computer system 100 for use in practicing the invention. The system 100 can include multiple remotely-located computers and/or processors. The computer system 100 comprises one or more processors 104 for executing instructions in the form of computer code to carry out a specified logic routine that implements the teachings of the present invention. The computer system 100 further comprises a memory 106 for storing data, software, logic routine instructions, computer programs, files, operating system instructions, and the like, as is well known in the art. The memory 106 can comprise several devices, for example, volatile and non-volatile memory components further comprising a random access memory RAM, a read only memory ROM, hard disks, floppy disks, compact disks including, but not limited to, CD-ROM, DVD-ROM, and CD-RW, tapes, flash drives and/or other memory components. The system 100 further comprises associated drives and players for these memory types.

In a multiple computer embodiment, the processor 104 comprises multiple processors on one or more computer systems linked locally or remotely. According to one embodiment, various tasks associated with the present invention may be segregated so that different tasks can be executed by different computers located locally or remotely from each other.

The processor 104 and the memory 106 are coupled to a local interface 108. The local interface 108 comprises, for example, a data bus with an accompanying control bus, or a network between a processor and/or processors and/or memory or memories. In various embodiments, the computer system 100 further comprises a video interface 120, one or more input interfaces 122, a modem 124 and/or a data transceiver interface device 125. The computer system 100 further comprises an output interface 126. The system 100 further comprises a display 128. The graphical user interface referred to above may be presented on the display 128. The system 100 may further comprise several input devices (not shown) including, but not limited to, a keyboard 130, a mouse 131, a microphone 132, a digital camera and a scanner (the latter two not shown). The data transceiver 125 interfaces with a hard disk drive 139 where software programs, including software instructions for implementing the present invention are stored.

The modem 124 and/or data receiver 125 can be coupled to an external network 138 enabling the computer system 100 to send and receive data signals, voice signals, video signals and the like via the external network 138 as is well known in the art. The system 100 also comprises output devices coupled to the output interface 126, such as an audio speaker 140, a printer 142, and the like.

Figure 3:
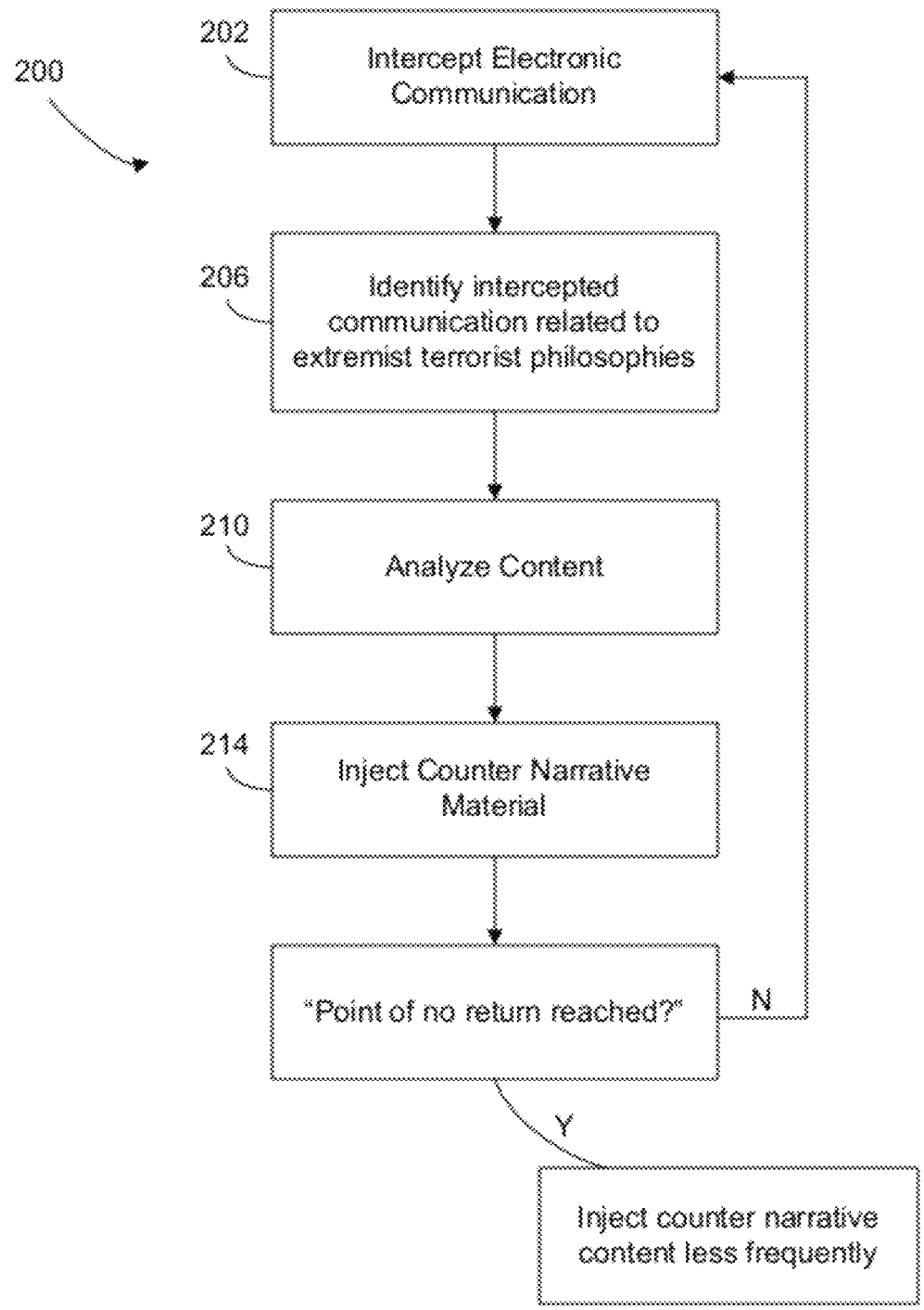
FIG. 3 is a flow diagram of monitoring and interdicting steps according to the present invention.

FIG. 3 is a flow chart 200 for implementation by the computer system 100 of FIG. 2. The flowchart 200 begins at a step 202 where electronic communication intended for or initiated by the individual is intercepted. At a step 206 the intercepted electronic communication that relates to extremist or terrorist philosophies is identified. The content of the electronic communication is analyzed at a step 210 to determine the nature of the content, the senders and recipients, referenced URL links, etc. At a step 214 counter-narrative material is injected into the individual's communication stream. The content of the counter-narrative material is determined based on the content of the intercepted extremist/terrorist communication, with the intent of countering that content. Step 218, again using the results of the prior analysis of the intercepted communication, attempts to determine whether the individual has progressed beyond a point of no return. This conclusion (which is not definitive given the nature of the content analysis, but merely provides an indication) is based upon a predetermined multi-variable threat matrix. It is surmised that once the individual as reached this "tipping point" additional injections of counter-narrative content will have less effect on countering the extremist/terrorist content. Thus such content may be injected less frequently as indicated at a step 222. If the individual has not reached the "tipping point" the process continues to the step 202.

Social network sites or services referred to herein are typically online service platforms or sites that focus on building and reflecting social networks or social relations among people, who, for example, share interests and/or activities. A social network service consists of a representation of each user (often a profile), his/her social links, and a variety of additional services. Most social network services are web-based and provide means for users to interact over the Internet, such as e-mail and instant messaging. Online community services are sometimes considered as a social network service, though in a broader sense, a social network service usually means an individual-centered service, whereas online community services are group-centered. Social networking sites allow users to share ideas, activities, events, and interests within their individual networks.

While the invention has been described with reference to various embodiments, it will be understood by those skilled in the art that various changes may be made and equivalent elements and process steps may be substituted for elements thereof without departing from the scope of the present invention. The scope of the present invention further includes any combination of the elements and process steps from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A method for combating electronic communication that causes an individual to engage in extremist or terrorist activities the method comprising:
   (a) intercepting electronic communication intended for or initiated by the individual over an Internet communication medium;
   (b) identifying electronic communication, as intercepted according to step (a), that relate to or describe extremist or terrorist activities as identified by keywords or phrases in the electronic communication;
   (c) analyzing content of the electronic communication that relates to extremist or terrorist activities as identified at step (b);
   (d) injecting counter-narrative content to the individual's communication stream, responsive to content analyzed at step (c), to counter determined content; and
   (e) displaying text associated with one or more of steps (a) through (d) on a display screen; and
   (f) determining that the individual has progressed beyond a threshold based upon a predetermined multi-variable threat matrix, wherein progress beyond the threshold indicates that additional executions of step (d) have less effect on countering the content analyzed at step (c).

\* \* \* \* \*